United States Patent
Inaba et al.

(10) Patent No.: US 12,066,544 B2
(45) Date of Patent: Aug. 20, 2024

(54) MEASUREMENT-VALUE CORRECTION METHOD FOR DISTANCE MEASURING DEVICE, AND DISTANCE MEASURING DEVICE

(71) Applicant: Hitachi-LG Data Storage, Inc., Tokyo (JP)

(72) Inventors: Seiji Inaba, Tokyo (JP); Katsumi Ito, Tokyo (JP)

(73) Assignee: HITACHI-LG DATA STORAGE, INC., Tokyo (JP)

( * ) Notice: Subject to any disclaimer, the term of this patent is extended or adjusted under 35 U.S.C. 154(b) by 958 days.

(21) Appl. No.: 17/091,029

(22) Filed: Nov. 6, 2020

(65) Prior Publication Data
US 2021/0270971 A1 Sep. 2, 2021

(30) Foreign Application Priority Data
Feb. 28, 2020 (JP) .................. 2020-033450

(51) Int. Cl.
*G01S 17/894* (2020.01)
*G01S 17/08* (2006.01)

(52) U.S. Cl.
CPC ............ *G01S 17/894* (2020.01); *G01S 17/08* (2013.01)

(58) Field of Classification Search
None
See application file for complete search history.

(56) References Cited

U.S. PATENT DOCUMENTS

| 9,921,312 B2 * | 3/2018 | Takano | ............ G01S 7/484 |
| 2014/0368613 A1 * | 12/2014 | Krupka | ............ G01S 7/497 348/46 |
| 2020/0309898 A1 * | 10/2020 | Boutaud | ............ G01S 17/894 |

FOREIGN PATENT DOCUMENTS

JP 2019-127375 A 8/2019

* cited by examiner

*Primary Examiner* — Yuqing Xiao
*Assistant Examiner* — Jempson Noel
(74) *Attorney, Agent, or Firm* — MATTINGLY & MALUR, PC (57) ABSTRACT

At a preparatory step for correction, in a state that a reflective tape made with a retroreflective material is pasted in advance onto a floor surface of a measurement space in a direction away from the distance-measuring device, a distance La to an inside area of the reflective tape, and a distance Lb to an outside area of the reflective tape adjacent to the inside area are measured by the distance-measuring device, while measurement positions Y are being scanned along the reflective tape. A correction formula for converting the distance Lb to the distance La is created from a relationship between the distance La and the distance Lb obtained at each measurement position Y. At an actual measurement step, a distance (actual measurement value x) to the target object measured by the distance-measuring device is corrected in accordance with the correction formula, and a measurement-distance corrected value y is calculated.

6 Claims, 5 Drawing Sheets

MEASUREMENT-VALUE CORRECTION METHOD FOR DISTANCE MEASURING DEVICE, AND DISTANCE MEASURING DEVICE

CLAIM OF PRIORITY

The present application claims priority from Japanese patent application serial No. JP 2020-33450, filed on Feb. 28, 2020, the content of which is hereby incorporated by reference into this application.

BACKGROUND OF THE INVENTION

(1) Field of the Invention

The present invention relates to a measurement-value correction method for a distance measuring device that measures the distance to a target object on the basis of the time of flight of light.

(2) Description of the Related Art

There are known distance measuring devices that use the method of measuring the distance to a target object on the basis of the time of flight (hereinafter, TOF: time of flight) of light (hereinafter, also called TOF devices). By displaying distance data acquired by the TOF devices as two-dimensional distance images, and tracing temporal changes of the distance data, travel routes of persons and the like can be determined, for example.

According to the principle of the TOF devices, irradiation light emitted from a light source is reflected off a target object, and time (optical path length) it takes for the irradiation light to return to a light receiving section is measured to calculate the distance to the target object. At that time, the target object can be sensed surely by attaching, to the target object, a material (so-called retroreflective material) having characteristics of reflecting light having been incident on the target object in the direction of incidence.

For example, JP-2019-127375-A describes that, in order to sense an operator who is on a travel path of an overhead-travelling crane, a marker made with a retroreflective material is attached to a helmet of the operator, and the operator is recognized thereby.

SUMMARY OF THE INVENTION

In a case where the distance measuring devices that use TOF are used in an environment where highly reflective materials are used for the surrounding wall, floor, or the like, unnecessary reflection from the wall, floor, or the like makes the optical path length appear to be longer to the distance measuring devices. This is called the multipath phenomenon, and as a result of it, the distance to a target object is measured as being longer than an actual distance, and measurement errors (distance errors) occur.

There is a known method described in JP-2019-127375-A for correction of distance errors that occur due to the multipath phenomenon in which method a retroreflective material is used. That is, by attaching the reflective tape made with the retroreflective material to a target object, and measuring the distance to the target object, the accurate distance to the target object can be acquired without being affected by the multipath phenomenon. Then, distances to the target object that are obtained when the reflective tape is attached and when the reflective tape is removed are measured in advance while the position of the target object is varied, and a correction formula is created from the relationship between both distances, and used for correction of distance errors.

However, as preparatory work for correction formula creation, an operator has to paste a reflective tape onto predetermined positions (e.g. at distances of 2 m, 3 m, . . . , etc.) of a target object (e.g. a floor surface), measure, with a TOF device, distances to the reflective tape, and distances in the case where the reflective tape is removed, and create a correction formula from measurement values of both types of distance, and this requires a huge work amount and working time.

An object of the present invention is to provide a measurement-value correction method and a distance measuring device that make it possible to reduce preparatory work to be performed by an operator for measurement value correction with a distance measuring device, and to create a correction formula automatically.

According to a first aspect of the present invention, a measurement-distance correction method for a distance measuring device that measures a distance to a target object on a basis of time of flight of light includes:
  a preparatory step for correction, the preparatory step for correction being performed in a state that a reflective tape made with a retroreflective material is pasted in advance onto a floor surface of a measurement space in a direction away from the distance measuring device, the preparatory step for correction including:
    a step of measuring, by the distance measuring device, a distance La to an inside area of the reflective tape and a distance Lb to an outside area of the reflective tape adjacent to the inside area while measurement positions are being scanned along the reflective tape; and
    a step of creating a correction formula for converting the distance Lb to the distance La from a relationship between the distance La and the distance Lb obtained at each measurement position; and
  a step of actual measurement of the distance to the target object including:
    a step of obtaining an actual measurement value x by measuring the distance to the target object by the distance measuring device; and
    a step of correcting the actual measurement value x in accordance with the correction formula, and calculating a measurement-distance corrected value y.

According to a second aspect of the present invention, a distance measuring device that measures a distance to a target object on a basis of time of flight of light includes:
  a light emitting section that emits irradiation light toward the target object;
  a light receiving section that detects reflected light from the target object;
  a light-emission control section that controls the light emitting section;
  a distance computing section that calculates the distance to the target object on a basis of time of flight of the reflected light detected at the light receiving section;
  a distance correcting section that uses a correction formula, and corrects the distance calculated at the distance computing section;
  a correction-formula storage section that stores the correction formula; and
  a correction-formula creating section that creates the correction formula.

In a measurement space where a reflective tape made with a retroreflective material is pasted in advance onto a floor surface in a direction away from the distance measuring device, the correction-formula creating section measures, by the distance computing section, a distance La to an inside area of the reflective tape, and a distance Lb to an outside area of the reflective tape adjacent to the inside area while measurement positions are being scanned along the reflective tape; and creates a correction formula for converting the distance Lb to the distance La from a relationship between the distance La and the distance Lb obtained at each measurement position.

According to the present invention, an operator only has to paste a reflective tape onto a floor surface to create a correction formula automatically, and the work amount and working time of the operator are reduced significantly.

BRIEF DESCRIPTION OF THE DRAWINGS

These and other features, objects and advantages of the present invention will become more apparent from the following description when taken in conjunction with the accompanying drawings wherein.

DETAILED DESCRIPTION OF THE EMBODIMENT

In the following, embodiments of the present invention are explained. It should be noted, however, that the interpretation of the present invention should not be limited to the description contents of the embodiments illustrated below. Those skilled in the art easily understand that specific configurations of the present invention may be modified within the scope not deviating from the idea and gist of the present invention.

In the configuration of the invention explained below, common and identical reference characters are used for identical portions or portions having similar functions through different drawings, and overlapping explanation is omitted in some cases.

A distance measuring device (TOF device) of the present embodiment has a function of correcting distance measurement values in accordance with a correction formula, but further has a function of creating, by itself, a correction formula used for the correction as well. In the following, a step for creating a correction formula in advance is called a "preparatory step," and a step of performing correction of actual measurement values by using the correction formula is called an "actual measurement step." In the preparatory step, data for correction formula creation is acquired by using a reflective tape as a measurement target object.

Figure 1:
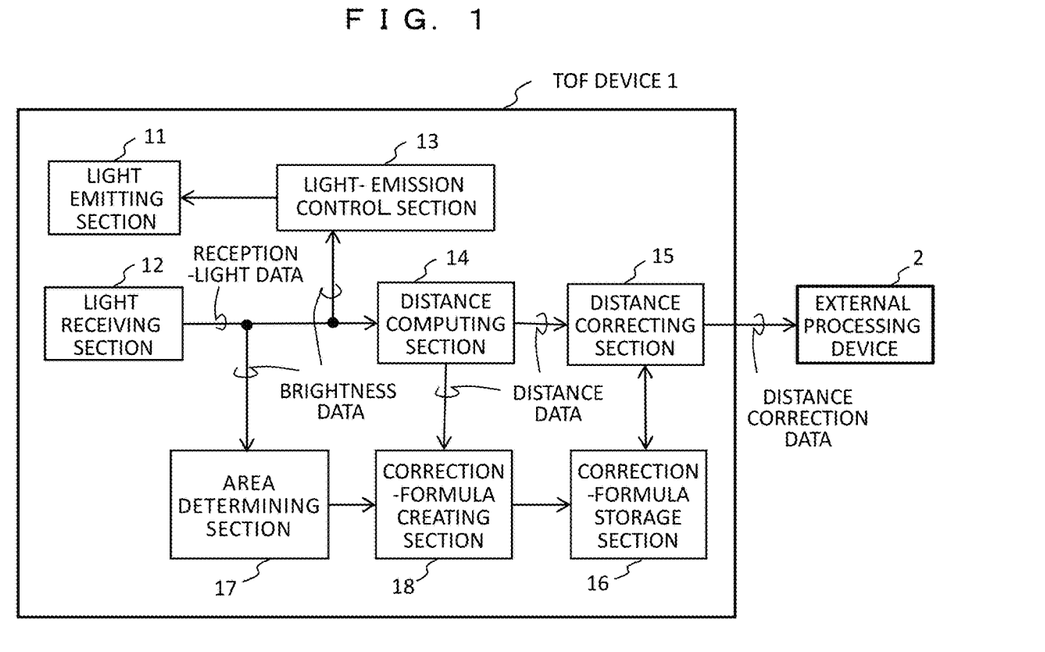
FIG. 1 is a figure illustrating the configuration of a distance measuring device according to the present embodiment.

FIG. 1 is a figure illustrating the configuration of a distance measuring device according to the present embodiment. A distance measuring device (TOF device) 1 includes, as configurations for the actual measurement step: a light emitting section 11 that irradiates a target object with pulsed light from a light source such as a laser diode (LD) or a light emitting diode (LED); a light receiving section 12 that receives, at a CCD sensor, a CMOS sensor or the like, the pulsed light reflected from the target object; a light-emission control section 13 that controls the light emitting section 11 such that it is turned on or turned off or such that the amount of light it emits is changed; a distance computing section 14 that computes a distance to the target object from a detection signal (reception-light data) of the light receiving section 12; and a distance correcting section 15 that corrects distance data output from the distance computing section 14. A correction formula to be used for the correction is stored in the correction-formula storage section 16 in advance.

Furthermore, in the present embodiment, as the preparatory step for creating the correction formula to be stored in the correction-formula storage section 16, distance data is acquired by the distance computing section 14 by using a reflective tape as a target object. Configurations to be used at that time include an area determining section 17 that determines a measurement area (the inside of the reflective tape or the outside of the reflective tape) of the target object on the basis of brightness data in the reception-light data, and a correction-formula creating section 18 that creates a correction formula by using the distance data from the distance computing section 14 and the area information from the area determining section 17. The created correction formula is stored in the correction-formula storage section 16, and used in the actual measurement step.

Although details of the preparatory step are mentioned below, a reflective tape made with a retroreflective material is pasted onto the floor surface of a measurement space in a direction away from the TOF device 1. Then, while measurement positions are being scanned along the reflective tape, distances to the inside area of the reflective tape and distances to the outside area of the reflective tape adjacent to the inside area are measured at predetermined positions. The correction-formula creating section 18 creates a correction formula for correcting differences (distance errors) between both types of distance by using measurement values at the positions. This series of operation is executed automatically by a dedicated program for correction formula creation stored in the TOF device 1.

At the actual measurement step, distance data corrected at the distance correcting section 15 of the TOF device 1 is sent to an external processing device 2. For example, the external processing device 2 includes a personal computer, generates a distance image by performing a colorization process of changing the hue of each section of a target object on the basis of the distance correction data, and outputs the image to a display which then displays the image. In addition, by tracing changes of the position of the target object on the basis of the distance data, the travel route of a person or the like can be determined.

Figure 2:
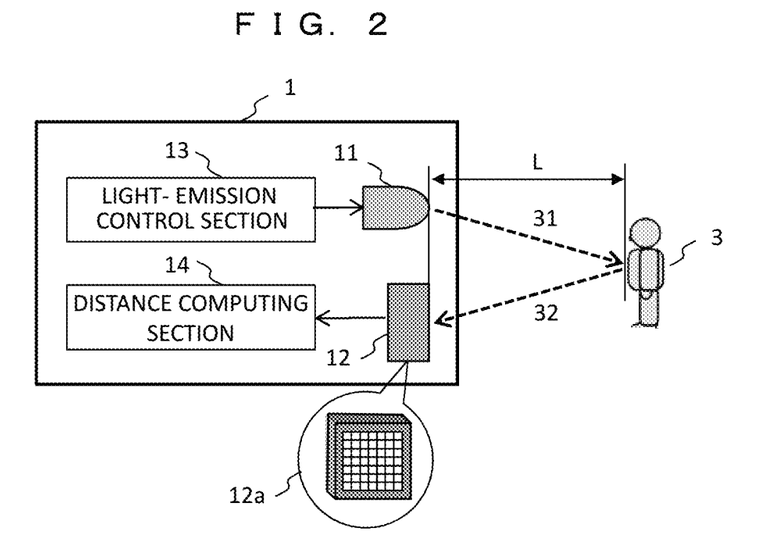
FIG. 2 is a figure for explaining the principle of distance measurement by TOF.

FIG. 2 is a figure for explaining the principle of distance measurement by TOF. The TOF device 1 has the light emitting section 11 and the light receiving section 12, and emits distance-measurement irradiation light 31 from the light emitting section 11 toward a target object 3 (e.g. a person). The light receiving section 12 receives, at a two-dimensional sensor 12a, reflected light 32 reflected off the target object 3. The two-dimensional sensor 12a is one having a plurality of two-dimensionally arrayed pixels such as a CCD sensor, and can obtain two-dimensional distance data from reception-light data at each pixel.

The target object 3 is at a position apart from the light emitting section 11 and the light receiving section 12 by a distance L. Here, assuming that the speed of light is c, and the temporal difference between emission of the irradiation light 31 by the light emitting section 11 and reception of the reflected light 32 by the light receiving section 12 is t, the distance L to the target object 3 is determined by L=c×t/2. Note that, instead of using the temporal difference t, in practical distance measurement performed by the distance computing section 14, an irradiation pulse with predetermined intervals is emitted, the pulse is received by the two-dimensional sensor 12a while the timing of the exposure gate of the two-dimensional sensor 12a is varied, and the distance L is calculated from values of reception-light amounts (accumulation amounts) at different timings (exposure-gate type).

Figure 3:
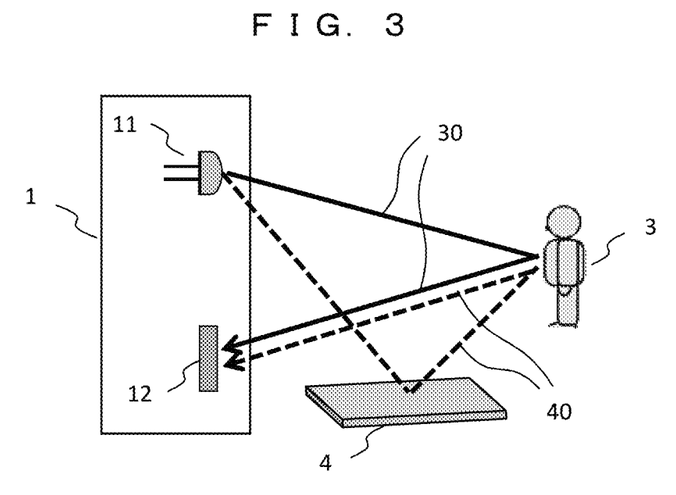
FIG. 3 is a figure for explaining the multipath phenomenon.

FIG. 3 is a figure for explaining the multipath phenomenon. The irradiation light emitted from the light emitting section 11 is reflected off the target object 3 to return to the light receiving section 12, and normally the path of the reflected light is the shortest optical path illustrated by a solid line 30. The light that travels along this optical path is called here "direct light." However, in an environment where there is a surrounding wall or floor 4 formed by using a highly reflective material, part of the irradiation light is reflected off the wall or floor 4 or the like, and returns to the light receiving section 12 along an optical path illustrated by a broken line 40. This phenomenon is called the "multipath phenomenon," and the light that travels along this optical path is called here "indirect light." Because the optical paths between the light emitting section 11 and the target object 3 or between the target object 3 and the light receiving section 12 along which the indirect light travels are not the shortest straight lines but are polygonal lines, the optical path 40 of the indirect light becomes longer than the optical path length of the optical path 30 of the direct light. The light receiving section 12 receives a mixture of the direct light and the indirect light, and errors occur to distances measured by the TOF device 1.

In a case where the multipath phenomenon has occurred, there is often not only one but a large number of optical paths of the indirect light, and there are also various intensity ratios of the indirect light to the direct light. The light receiving section 12 receives direct light, and a lot of indirect light with delays relative to the direct light. In the case of an exposure-gate type light receiving section, a reception-light amount detected in a predetermined gate period differs from a true reception-light amount in the case of only the direct light, and so the difference is observed as an error in a distance calculation.

If a measurement error occurs due to the multipath phenomenon, the distance to a target object is calculated as being longer than an actual distance, and various problems occur. For example, it is supposed here that a plurality of the TOF devices are installed, and a travel route of a target object (person) in a room is determined. In an environment where highly reflective marble is used for the surrounding wall or floor in an elevator hall, errors of measurement values of the distance from each TOF device to a person easily occur due to the multipath phenomenon. As a result, in a case where the coordinates of a person is determined from a distance measurement value, and the coordinates are continuously used to trace the travel route, a problem occurs that the route of the one person is split into two routes or the coordinates become discontinuous at an intersection between the measurement directions of TOF devices, and the route is interrupted.

In order to cope with the multipath phenomenon like this, in the present embodiment, a TOF device is installed in a measurement environment, a target object (reflective tape) is pasted onto a predetermined position in advance, and distance errors that occur in the actual environment are measured. Then, in accordance with the distance errors that have occurred, a correction formula for correcting them is created. This work of the preparatory step is automated, and the burden of an operator is reduced. In the following, the preparatory step is explained in detail.

Figure 4A:
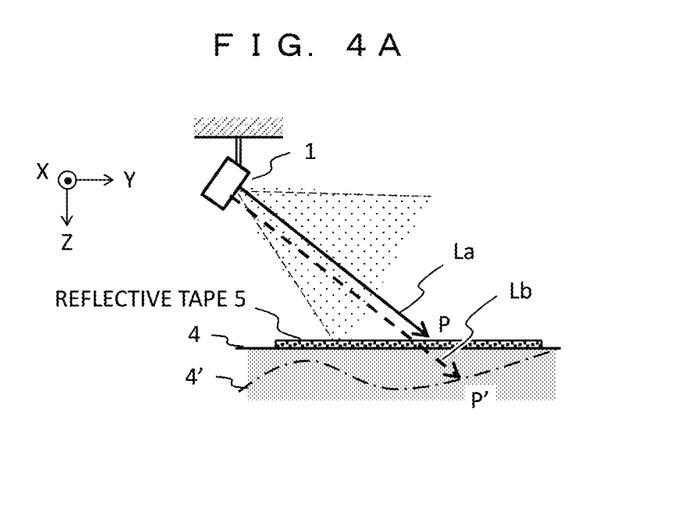
FIGS. 4A to 4C are figures for explaining a distance-error measurement method at a preparatory step.
Figure 4B:
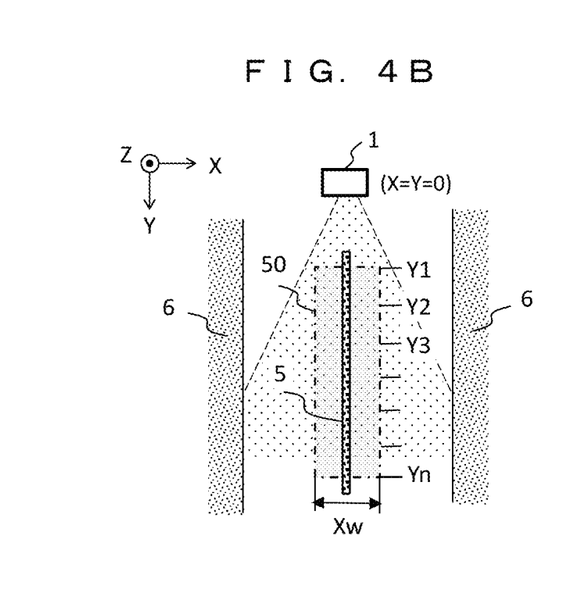
Figure 4C:
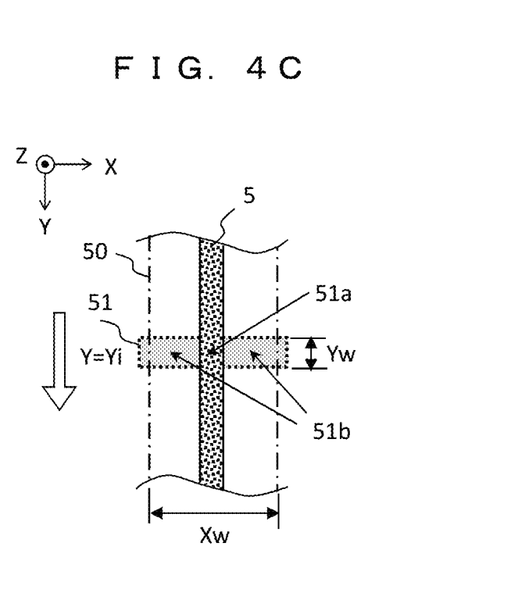

FIGS. 4A to 4C are figures for explaining a distance-error measurement method at the preparatory step. First, an operator installs the TOF device 1 in an actual usage environment, and pastes a reflective tape as a measurement target object onto the floor surface of the measurement space. Although it is supposed here that the measurement space is an indoor space, the reflective tape may be pasted onto a road surface or the like in a case where the measurement space is an outdoor space.

FIG. 4A is a side view of the measurement environment, FIG. 4B is a plan view of the measurement environment, and FIG. 4C is a plan view illustrating a measurement area including the reflective tape. As the coordinate axes for explanation here, the forward direction as seen from the TOF device 1 is defined as the Y axis, the leftward and rightward direction is defined as the X axis, and the upward and downward direction is defined as the Z axis. The position of the TOF device 1 is defined as the origin of coordinates (X=Y=Z=0).

As illustrated in FIGS. 4A and 4B, the TOF device 1 is attached to the ceiling, and a space located diagonally downward from the TOF device 1 is set as the measurement space. At that time, it is supposed that indirect light occurs due to reflection of light on a floor surface 4 and a side wall 6 of the measurement space, and the measurement is affected by multipath. Accordingly, a measurement value Lb (broken line) of the distance from the TOF device 1 to a position P on the floor surface 4 becomes a large value affected by multipath, as compared to a measurement value La (solid line) not affected by multipath. In other words, due to the multipath phenomenon, the position P of the floor surface 4 looks as if it has sunk to a position P' on a floor surface 4'. The difference (Lb−La) between the two measurement values La and Lb is a distance error, but because the degree of occurrence of indirect light depends on positions in the measurement space, different distance errors occur depending on measurement positions.

In order to measure distance errors efficiently while measurement positions are changed, a reflective tape 5 is used as a measurement target object in the present embodiment. The reflective tape 5 is made with a retroreflective material having characteristics of reflecting light having been incident thereon in the direction of incidence. Accordingly, the reflective tape 5 is less likely to generate indirect light, and the measurement is less likely to be affected by multipath.

As illustrated in FIG. 4B, the reflective tape 5 is pasted, along the Y-axis direction, on the floor surface 4 (X-Y plane) located in a measurement direction of the TOF device 1. The shape of the reflective tape 5 used has an approximately 5-cm width and an approximately 10-m length, for example. A measurement area 50 of the TOF device 1 is a rectangular area including the reflective tape 5 at its middle portion, distances on the Y axis from the TOF device 1 are within the range of Y1 to Yn (e.g. 2 m to 8 m), and the measurement area 50 has a width Xw (e.g. 1 m) that covers areas on the floor surface 4 adjacent to the reflective tape 5.

FIG. 4C illustrates a measurement area as an enlarged view. While the measurement area 50 is being scanned with a measurement window 51 in the Y-axis direction, the distance to an area in the measurement window 51 at each position Yi (i=1, 2, ... n) on the Y axis is measured. The size of the measurement window 51 in the X direction is equal to the width Xw of the measurement area 50, and a width Yw in the Y-direction is 2 cm, for example. The measurement window 51 includes an inside area 51a of the reflective tape 5, and an outside area 51b of the reflective tape 5 adjacent to the inside area 51a, and distance data is obtained from both areas. Note that the scanning operation with the measurement window 51 can be performed by selectively scanning corresponding pixel areas in the two-dimensional sensor 12a of the light receiving section 12.

The distance data from within the measurement window 51 is separated into data about the distance to the inside area 51a of the reflective tape 5 and data about the distance to the outside area 51b of the reflective tape 5. In order to separate the distance data, the area determining section 17 uses brightness data from the light receiving section 12 to determine whether a measurement position is in the area 51a or in the area 51b. That is, the reception-light amounts (brightness) of pixels in the measurement window 51 are compared, and the pixels are separated into a pixel group with high brightness and a pixel group with low brightness. Then, the high-brightness pixel group is considered as being corresponding to the inside area 51a of the reflective tape 5, and the average of distance data of pixels in the high-brightness pixel group is calculated, and set as the measurement value La. On the other hand, the low-brightness pixel group is considered as being corresponding to the outside area 51b (i.e. the floor surface 4) of the reflective tape 5, and the average of distance data of pixels in the low-brightness pixel group is calculated, and set as the measurement value Lb.

In this manner, the measurement value La at the inside area 51a of the reflective tape 5 not affected by multipath, and the measurement value Lb at the outside area 51b of the reflective tape 5 affected by multipath can be acquired simultaneously at the same measurement position Yi, and so the measurement efficiency improves significantly.

Note that the intensity of reflected light differs in the measurement area 50 depending on the distance from the TOF device 1 (the position Yi of the measurement window 51). In a case where the measurement position is near, the sensor 12a of the light receiving section 12 becomes saturated, and in a case where the measurement position is far, light reception becomes insufficient. Accordingly, on the basis of the brightness data from the light receiving section 12, the light-emission control section 13 adjusts the intensity of the irradiation light from the light emitting section 11, and controls the intensity such that the brightness level is kept within a predetermined range.

Figure 5:
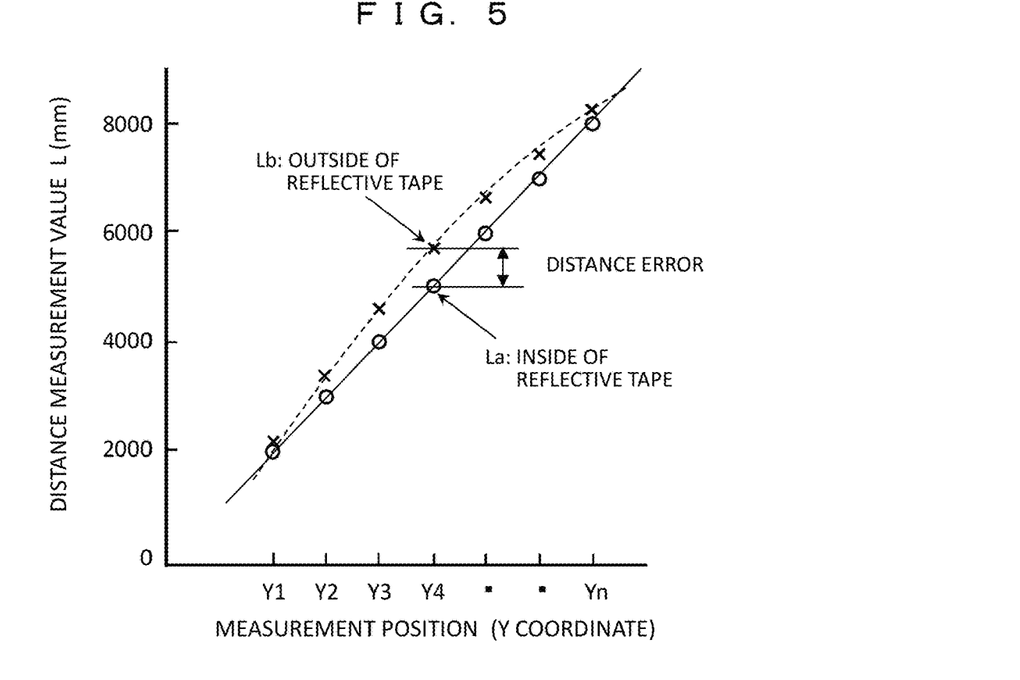
FIG. 5 is a figure illustrating an example of a distance error measurement result.

FIG. 5 is a figure illustrating an example of a distance error measurement result. Measurement positions (Y coordinates) are plotted on the horizontal axis, and the measurement value La (symbol O) of the inside of the reflective tape, and the measurement value Lb (symbol x) of the outside of the reflective tape are plotted on the vertical axis. The measurement value La of the inside of the reflective tape is not affected by multipath, but the measurement value Lb of the outside of the reflective tape is affected by multipath, and so is larger than the measurement value La.

In addition, it can be found that the distance error (Lb−La) due to multipath is not constant but varies in accordance with the measurement position (Y). This means that the influence of the measurement environment (the degree of the reflection of the indirect light off the floor or wall) varies depending on the measurement position.

After the measurement values La and Lb corresponding to occurrence and nonoccurrence of multipath are acquired in this manner, the correction-formula creating section 18 creates a correction formula on the basis of the relationship between the measurement values La and Lb. The correction formula is an approximation formula that converts the measurement value Lb into the measurement value La, and can be determined automatically by a known method such as the least-squares method.

Figure 6:
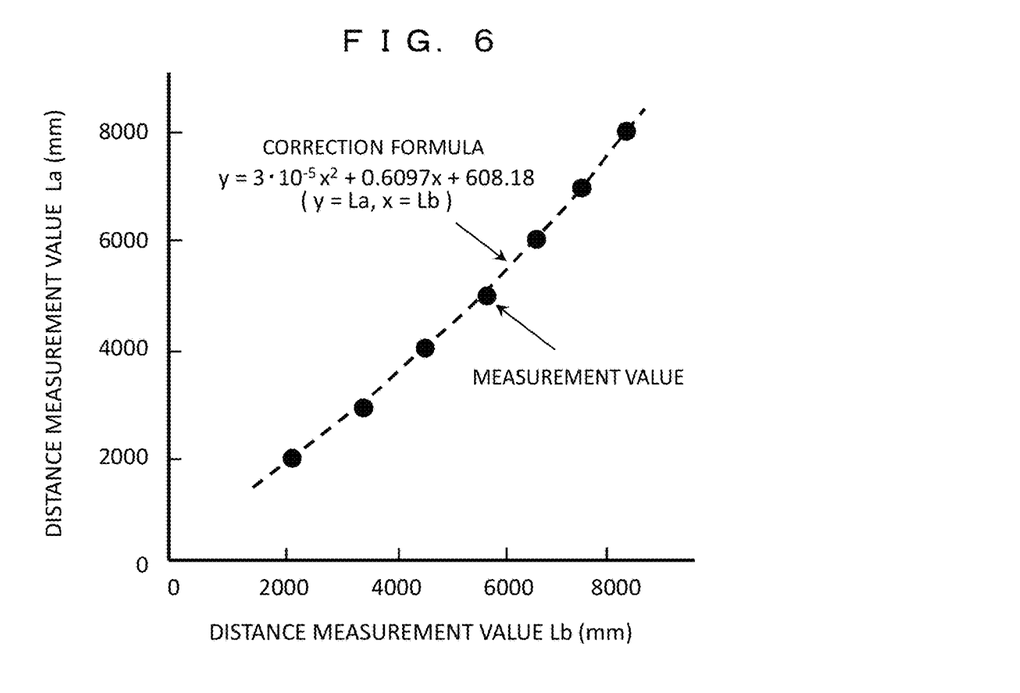
FIG. 6 is a figure for explaining an example of correction formula creation.

FIG. 6 is a figure illustrating an example of creation of the correction formula. The measurement value Lb of the outside (affected by multipath) of the reflective tape is plotted on the horizontal axis, the measurement value La of the inside (not affected by multipath) of the reflective tape is plotted on the vertical axis, and measurement values of both types in FIG. 5 are plotted with the symbol ●. As an approximation formula passing through these measurement points, a broken line illustrates nonlinear approximation performed by using a quadratic formula ($y=ax^2+bx+c$). In the correction formula, a variable x corresponds to the measurement value Lb, and a variable y corresponds to the measurement value La. Approximation formulae are not limited to this, and may be polynomials of still higher degrees or formulae incorporating functions.

The correction formula created at the preparatory step or the coefficients (a, b, c) of the correction formula are stored in the correction-formula storage section 16 in the TOF device 1 illustrated in FIG. 1. Then, at the actual measurement step, the distance correcting section 15 uses the correction formula to convert distance data x calculated at the distance computing section 14 to distance correction data y by correction. Thereby, even in a multipath environment, it becomes possible to correct errors of the distance to a target object, and trace a travel route of a person or the like precisely.

According to the preparatory step for correction formula creation described above, as a method of measuring distance errors that occur due to the multipath phenomenon, data of the state not affected by multipath and the state affected by multipath can be acquired by performing measurement once. That is, an operator only has to paste a reflective tape onto a floor surface, and a series of preparatory work for correction formula creation can be executed automatically by a dedicated program. Accordingly, the burden of the operator can be reduced significantly.

Figure 7:
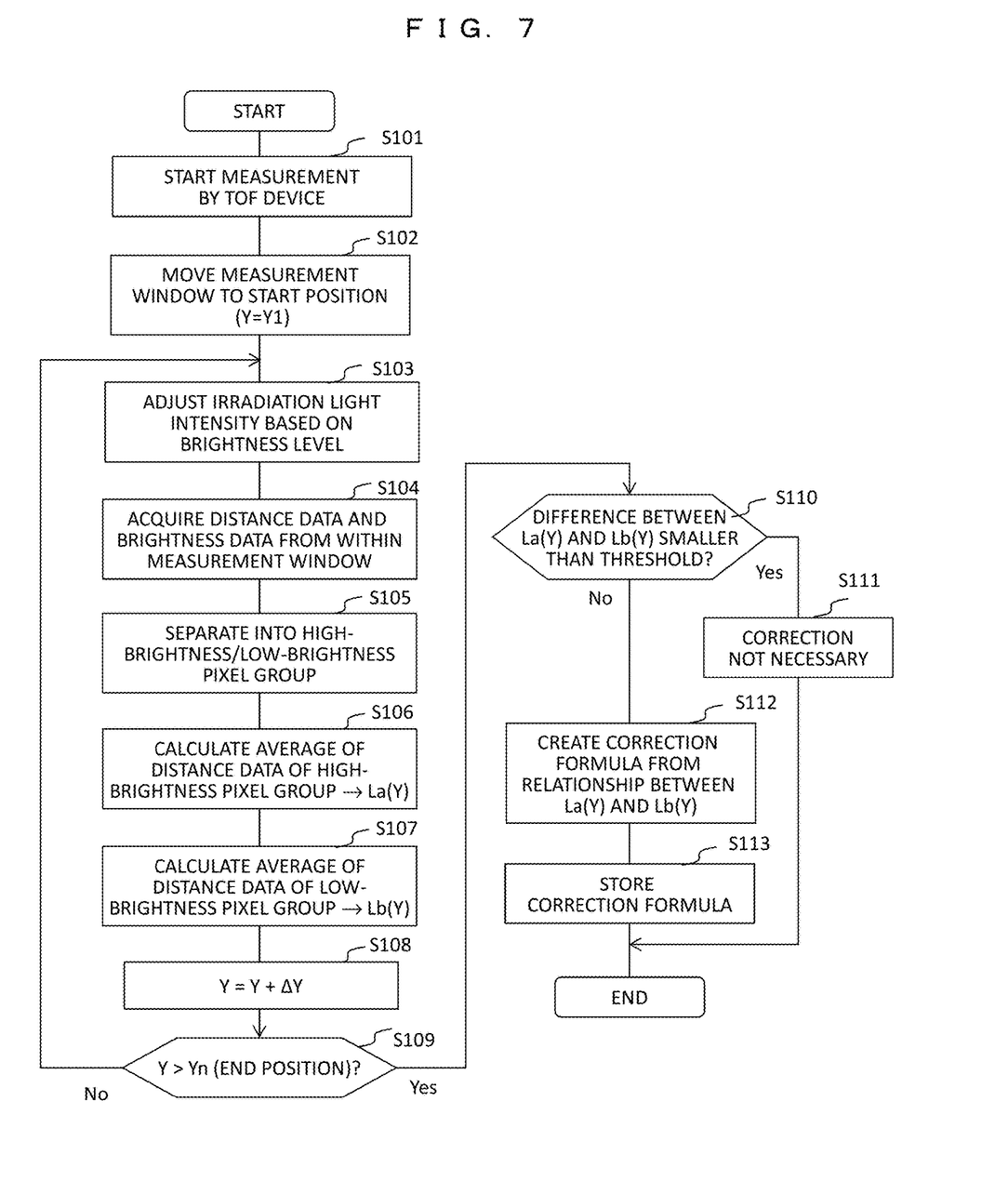
FIG. 7 is a flowchart illustrating a procedure of correction formula creation.

FIG. 7 is a flowchart illustrating a procedure of correction formula creation in the present embodiment. As preparation for correction formula creation, an operator installs the TOF device 1 in an actual usage environment, and makes a reflective tape pasted onto a floor surface located in a measurement direction. In the following explanation, reference characters in FIGS. 4A to 4C are used.

S101: The TOF device 1 is activated, and measurement of distances and brightness of the measurement area 50 including the reflective tape 5 is started. The measurement area 50 is located within the range of Y=Y1 (2 m) to Yn (8 m), and a measurement interval ΔY is 1 m, for example. Distance data is acquired for each pixel of the two-dimensional sensor 12a of the light receiving section, and brightness data at each pixel position is acquired.

S102: The measurement window 51 is moved to a start position (Y=Y1) of the measurement area 50. This is done by selecting a read-out position of the two-dimensional sensor 12a. The measurement window 51 has the width Yw (=±1 cm) in the Y-direction, and the width Xw (=±0.5 m) in the X direction.

S103: Brightness data at the current measurement position is read out, and the intensity of the irradiation light of the light emitting section 11 is adjusted such that the brightness level is kept within a predetermined range. For this purpose, for example, reflected light from the area 51a of the reflective tape 5 may be monitored, and the intensity may be adjusted by the light-emission control section 13.

S104: The distance data and brightness data from within the measurement window 51 are acquired. That is, the distance data and brightness data are acquired from each pixel included in the area of the width Yw in the Y-direction, and the area of the width Xw in the X direction.

S105: On the basis of the distribution of the brightness data from within the measurement window 51, pixels included in the measurement window 51 are separated into a group of pixels that detected high-brightness light from the inside of the reflective tape and a group of pixels that detected low-brightness light from the outside of the reflective tape.

S106: The average of distance data of the high-brightness pixel group in the acquired distance data is calculated as La (Y), and is stored on the memory of the correction-formula creating section 18.

S107: The average of distance data of the low-brightness pixel group in the acquired distance data is calculated as Lb (Y), and is stored on the memory of the correction-formula creating section 18.

S108: The position of the measurement window 51 is moved by the measurement interval ΔY (=1 m) (Y=Y+ΔY).

S109: It is determined whether the position Y of the measurement window 51 has exceeded the end position Yn (=8 m) of the measurement area 50. If it is determined that the position Y has exceeded the end position Yn (Yes), the process proceeds to S110. If it is determined that the position Y has not exceeded the end position Yn (No), the process returns to S103, and the process described above is repeated.

S110: La (Y) and Lb (Y) determined at S106 and S107 are read out from the memory, and it is determined whether or not the difference between both values at the same position Y is smaller than a threshold at all the positions Y. The threshold is 3%, for example. If the difference is smaller than the threshold, (Yes), the process proceeds to S111, and if the difference is not smaller than the threshold (No), the process proceeds to S112.

S111: It is judged that the measurement errors are negligible, and there is no influence of multipath, and correction of the measurement values is not performed.

S112: On the basis of the relationship between La (Y) and Lb (Y), a correction formula for converting the measurement value Lb (Y) to the measurement value La (Y) is created. The creation of the correction formula is performed automatically by a known method such as the least-squares method.

S113: The created correction formula (e.g. $y=ax^2+bx+c$) or the coefficients (a, b, c) is/are stored in the correction-formula storage section 16.

The preparatory step of the correction formula creation is completed here. Thereafter, by using the correction formula, the distance correcting section 15 corrects an actual distance measurement value obtained at the actual measurement step, and outputs the corrected distance measurement value.

Although the explanation above is about one TOF device, in a case where a plurality of TOF devices are installed, a reflective tape may be used for each TOF device, and a correction formula may be created for each TOF device.

In the manner mentioned above, at the preparatory step in the present embodiment, as a method of measuring distance errors that occur due to the multipath phenomenon, an operator only has to paste a reflective tape onto a floor surface, and data of the state not affected by multipath and the state affected by multipath can be acquired by performing measurement once. Thereby, a correction formula is created automatically, and the work amount and working time of the operator are reduced significantly.

What is claimed is:

1. A measurement-distance correction method for a distance measuring device that measures a distance to a target object on a basis of time of flight of light, the measurement-distance correction method comprising:
   a preparatory step for correction, the preparatory step for correction being performed in a state that a reflective tape made with a retroreflective material is pasted in advance onto a floor surface of a measurement space in a direction away from the distance measuring device, the preparatory step for correction including:
      a step of measuring, by the distance measuring device, a distance La to an inside area of the reflective tape and a distance Lb to an outside area of the reflective tape adjacent to the inside area while measurement positions are being scanned along the reflective tape; and
      a step of creating a correction formula for converting the distance Lb to the distance La from a relationship between the distance La and the distance Lb obtained at each measurement position; and
   a step of actual measurement of the distance to the target object including:
      a step of obtaining an actual measurement value x by measuring the distance to the target object by the distance measuring device; and
      a step of correcting the actual measurement value x in accordance with the correction formula, and calculating a measurement-distance corrected value y.

2. The measurement-distance correction method according to claim 1,
   wherein the distance measuring device emits irradiation light, and receives reflected light from the target object at a plurality of two-dimensionally arrayed pixels,
   the step of measuring the distances in the preparatory step includes:
      a step of receiving reflected light from a measurement window including an inside area of the reflective tape, and an outside area of the reflective tape adjacent to the inside area at a plurality of pixels while the measurement window is being scanned;
      a step of comparing brightness data of light received by each pixel, and determining that an area with high brightness is an inside area of the reflective tape, and an area with low brightness is an outside area of the reflective tape; and
      a step of calculating an average of distance data of pixels corresponding to areas with high brightness, and an average of distance data of pixels corresponding to areas with low brightness as the distance La and the distance Lb, respectively.

3. The measurement-distance correction method according to claim 2, wherein the step of measuring the distances in the preparatory step includes a step of adjusting an intensity of irradiation light such that the brightness data of the reflected light from the measurement window is kept within a predetermined range.

4. The measurement-distance correction method according to claim 1,
wherein in a case where a difference between the distance La and the distance Lb obtained for each measurement position as a result of the step of measuring the distances in the preparatory step is smaller than a threshold, the correction formula is not created, and
the actual measurement value x is not corrected but is used as is at the actual measurement step.

5. A distance measuring device that measures a distance to a target object on a basis of time of flight of light, the distance measuring device comprising:
a light emitting section that emits irradiation light toward the target object;
a light receiving section that detects reflected light from the target object;
a light-emission control section that controls the light emitting section;
a distance computing section that calculates the distance to the target object on a basis of time of flight of the reflected light detected at the light receiving section;
a distance correcting section that uses a correction formula, and corrects the distance calculated at the distance computing section;
a correction-formula storage section that stores the correction formula; and
a correction-formula creating section that creates the correction formula,
wherein in a measurement space where a reflective tape made with a retroreflective material is pasted in advance onto a floor surface in a direction away from the distance measuring device, the correction-formula creating section
measures, by the distance computing section, a distance La to an inside area of the reflective tape, and a distance Lb to an outside area of the reflective tape adjacent to the inside area while measurement positions are being scanned along the reflective tape; and
creates a correction formula for converting the distance Lb to the distance La from a relationship between the distance La and the distance Lb obtained at each measurement position.

6. The distance measuring device according to claim 5,
wherein the light receiving section receives reflected light from the target object at a plurality of two-dimensionally arrayed pixels,
the correction-formula creating section measures the distances by receiving reflected light from a measurement window including an inside area of the reflective tape, and an outside area of the reflective tape adjacent to the inside area at a plurality of pixels of the light receiving section while the measurement window is being scanned,
the distance measuring device has an area determining section that compares brightness data of light received by each pixel, and determines that an area with high brightness is an inside area of the reflective tape, and an area with low brightness is an outside area of the reflective tape, and
an average of distance data of pixels corresponding to areas with high brightness, and an average of distance data of pixels corresponding to areas with low brightness are calculated as the distance La and the distance Lb, respectively.

* * * * *